INVENTOR
Frank R. Gustavson

INVENTOR
Frank R. Gustavson

March 31, 1964  F. R. GUSTAVSON  3,127,505
AEROSOL PARTICLE COUNTER
Filed April 26, 1960
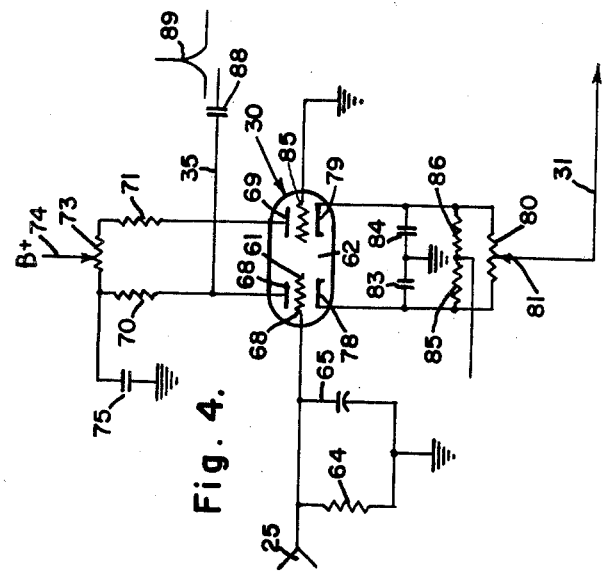
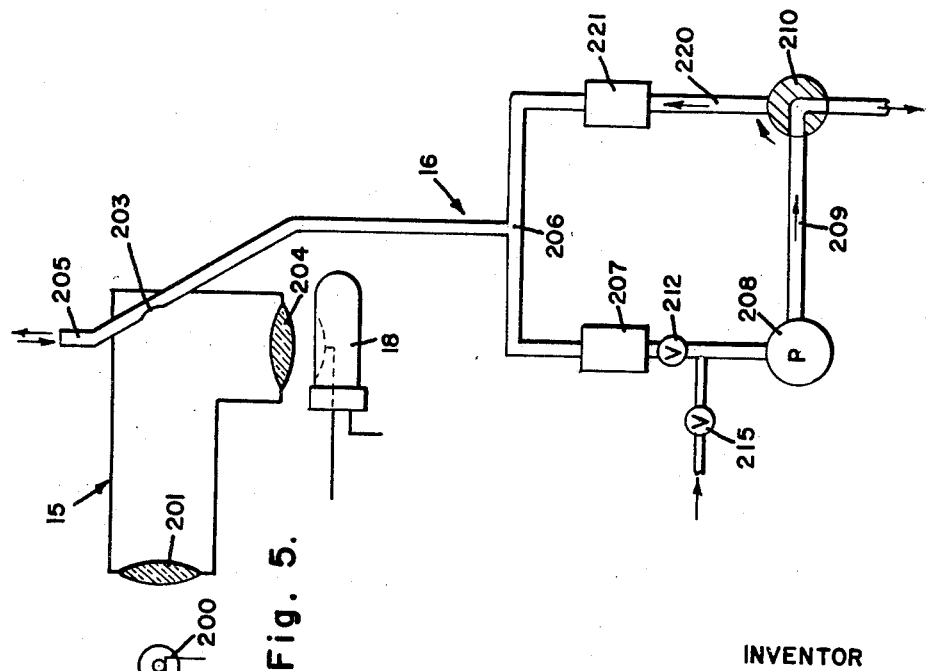
INVENTOR
Frank R. Gustavson
BY
Townsend and Townsend
attorneys 3,127,505
Patented Mar. 31, 1964

3,127,505
AEROSOL PARTICLE COUNTER
Frank R. Gustavson, Mountain View, Calif., assignor to Royco Instrument, Inc., Mountain View, Calif., a corporation of California
Filed Apr. 26, 1960, Ser. No. 24,768
10 Claims. (Cl. 235—92)

This invention relates to an improved method of and apparatus for measuring quantity and sizes of aerosol particles.

It is quite important in certain scientific applications to be able to determine the number and size of particles that might be carried within the atmosphere. For example in the manufacture of semi-conductors it is necessary to have a room which is as completely free of contaminating aerosol particles as possible. It is therefore necessary to use an instrument capable of measuring the presence of such particles to determine the cleanliness of the air within the room.

In other applications it is desirable to know the precise amount and size of impurities within the atmosphere. Such applications, for example, may include the measuring of smog or vapor content within an atmospheric area.

The principal object of this invention is to provide a new device which will process the information sensed by a particle reading device and process the sensed information to form a permanent record reflecting the quantity of particles within predetermined size groups within predetermined time periods.

Another object of this invention is to provide a in such a device a control which will allow the device to selectively sense and record total particle count as well as a break down particle count to individual size groups.

A further object of this invention is to provide a novel discriminating circuit which is capable of analyzing the particle count information in order to count only particles within a predetermined size group.

Still a further object of this invention is to provide a novel electronic circuit which is capable of providing pulse information which may be directly read by a recording device to record total particle count and alternatively to provide more refined pulse output information that can be discriminated to determine a particle count of particles of selected size groups.

A still further object of this invention is to provide a novel particle sensing device incorporating an air flow system in which the ambient air is drawn through the particle sensing apparatus in one phase of operation and in which a reversed filtered air flow can be directed through the sensing device which will give a clean standard and at the same time provide means for cleaning the tube of foreign particles, which may become lodged therein.

Other objects of the present invention will become apparent upon reading the following specification and referring to the accompanying drawings in which similar characters of reference represent corresponding parts in each of the several views.

In the drawings:

FIG. 4 is a schematic view showing the integrating circuit.

FIG. 5 is a diagrammatic view showing the pneumatic circuit for establishing air flow through the sensing device.

Figure 1:
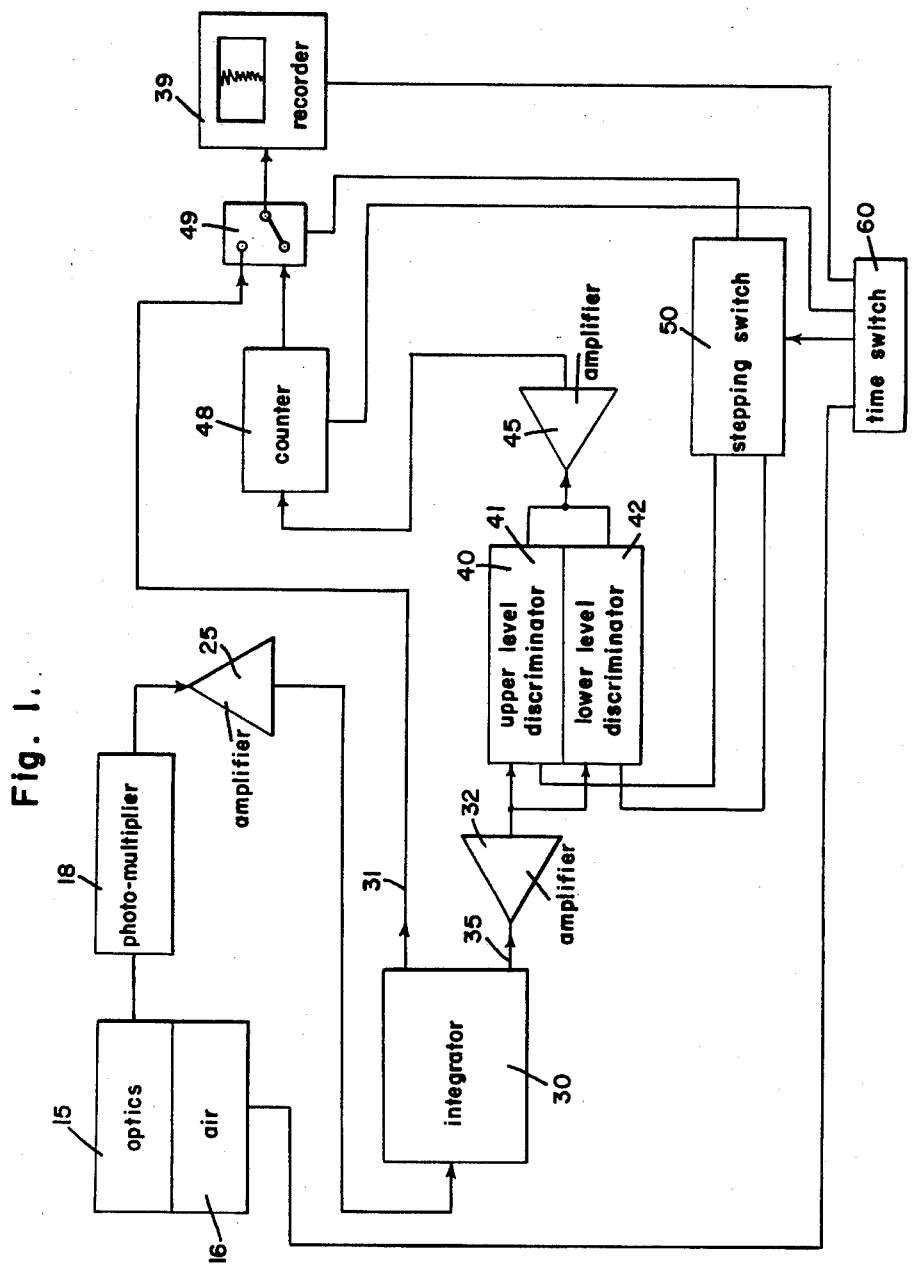
FIG. 1 is a block diagram showing the relationship of the various components and logic of the particle counter.

Referring now to the drawings and with particular reference to FIG. 1 there is provided an optical system indicated at 15 through which air from an air supply 16 is drawn so as to establish a flow of ambient or test air through optical system 15.

The optical device is arranged to register on a photomultiplier 18 in order to give pulse output in which each pulse is indicative of a particle and in which the height of the pulse is an analogue of the particle size. The basic optical and photo-multiplier arrangement is conventional in the art, and may consist of a number of types of devices which are capable of performing this function. Such a device, as shown in Patent No. 2,732,753 to O'Konski, may be used for the optical registration of particles wherein the output from the optical device is registered on a conventional photo-multiplier type tube.

The output from the photo-multiplier is directed to a pre-amplifier 25 and thereafter fed into an integrator circuit 30. The integrator is shown specifically in schematic view in FIG. 4 and will be hereinafter described in more detail.

The integrator functions to alternatively provide two signal outputs. The first signal appearing on line 35 is arranged to provide pulse output to an amplifier 32. The pulse output on line 35 is shaped to provide a series of spikes of various amplitudes for the amplifier. The pulse output from the second line 35 is integrated to provide an instantaneous D.C. output which is an analogue of the total particle count. The output from line 31 is fed directly to a recorder such as indicated at 39 for direct recording of an analogue voltage directly correlated to the instantaneous totalized aerosol particle count sensed by photo-multiplier 18.

The output from amplifier 32 is fed to a discriminator circuit 40 which is formed of an upper level circuit 41 and a lower level circuit 42. The upper level is arranged to sense pulses above a predetermined limit and the lower level circuit is arranged to sense pulses below a predetermined limt. The upper and lower level discriminators are arranged in cancelling relation so that the output from the discriminator circuit reflects only those pulses which are below the level of the upper discriminator and above the level of the lower discriminator and thus the two discriminators only detect pulses within a limited range and deliver the pulses to an amplifier 45. The output of the amplifier is fed directly to a counter 48. At the end of predetermined time intervals the output of the counter is fed directly to recording device 39 which records the pulse count from counter 48.

A function switch 49 is arranged to connect the recorder to either line 35 or to counter 48 depending upon the function desired.

A stepping switch 50 is arranged to control the input bias of the upper and lower level discriminators. The stepping switch thus functions to progressively change the range of particle size directed to counter 48.

A timer selection switch 60 is arranged to control the function of the stepping switch, the recorders and function switch 49 so that the recorder will be activated to receive the total pulse count from counter 48 at periodic intervals and will allow the stepping switch to advance at other predetermined intervals to select individual particle ranges during different time intervals in progressive order.

The timing switch also functions to control air supply 16 in a manner that will cause the air supply to be in one of several phases of operation as will hereinafter be described.

As particularly can be seen in FIG. 4 integrator circuit 30, which functions as a cathode follower, receives its input from pre-amplifier 25 into the grid 61 of a dual triode 62. A grid bias resistor 64 and a capacitor 65 are connected between grid 61 and ground.

The anodes 68 and 69 are each connected through plate load resistors 70 and 71 to the respective anodes. The resistors are connected across a potentiometer 73 in which the slider 74 of the potentiometer is connected to the B-plus supply. Potentiometer 73 functions to equalize the voltage on the respective anodes 68 and 69. Output line 35 is connected to anode 68 and a capacitor 75 is connected between the same lead and ground.

The cathodes 78 and 79 of dual triode 62 are connected to opposite terminals of a potentiometer 80, the slider 81 of which is connected to output line 31.

The two condensers 83 and 84 are connected from each cathode 78 and 79 to ground. The cathodes are supplied with cathode potential through resistors 85 and 86 so as to balance the tube within its optimum operational range. The resistors also function with condensers 83 and 84 to create an RC time constant the function of which will be hereinafter described.

In operation when a signal appears from pre-amplifier 25 there is a change in cathode potential which directly reflects the pulse input into grid 61. The pulse output is seen on line 35, and is passed through condenser 88 to the discriminating circuits. The shape of the pulse that appears across condenser 88 is as indicated at 89. The pulse is a substantially spiked form having an amplitude which is directly related to the amplitude of the pulse appearing at the input line.

The output on line 31 is integrated to provide a time totaling of the cathode voltage shifts occasioned by the pulses appearing on grid 61. The RC time constant of condensers 83 and 84 together with resistors 85 and 86 smooths out or integrates the respective pulses appearing on grid 61 so that the aggregate voltage appearing on line 31 is a fluctuating D.C. value which is related to the totalized pulse input into integrator circuit 30. The output may be directly applied to a recording device such as recorder 39.

The circuit is so arranged with a switch device such as switch 49 so that the output from line 35 or line 31 is utilized alternatively. The integrated circuit thus functions alternatively to provide one of two outputs, one an A.C. output which directly reflects the discrete pulses that appear in the input or a D.C. output which reflects the aggregate over a predetermined time interval of pulses appearing during that time interval.

Figure 3:
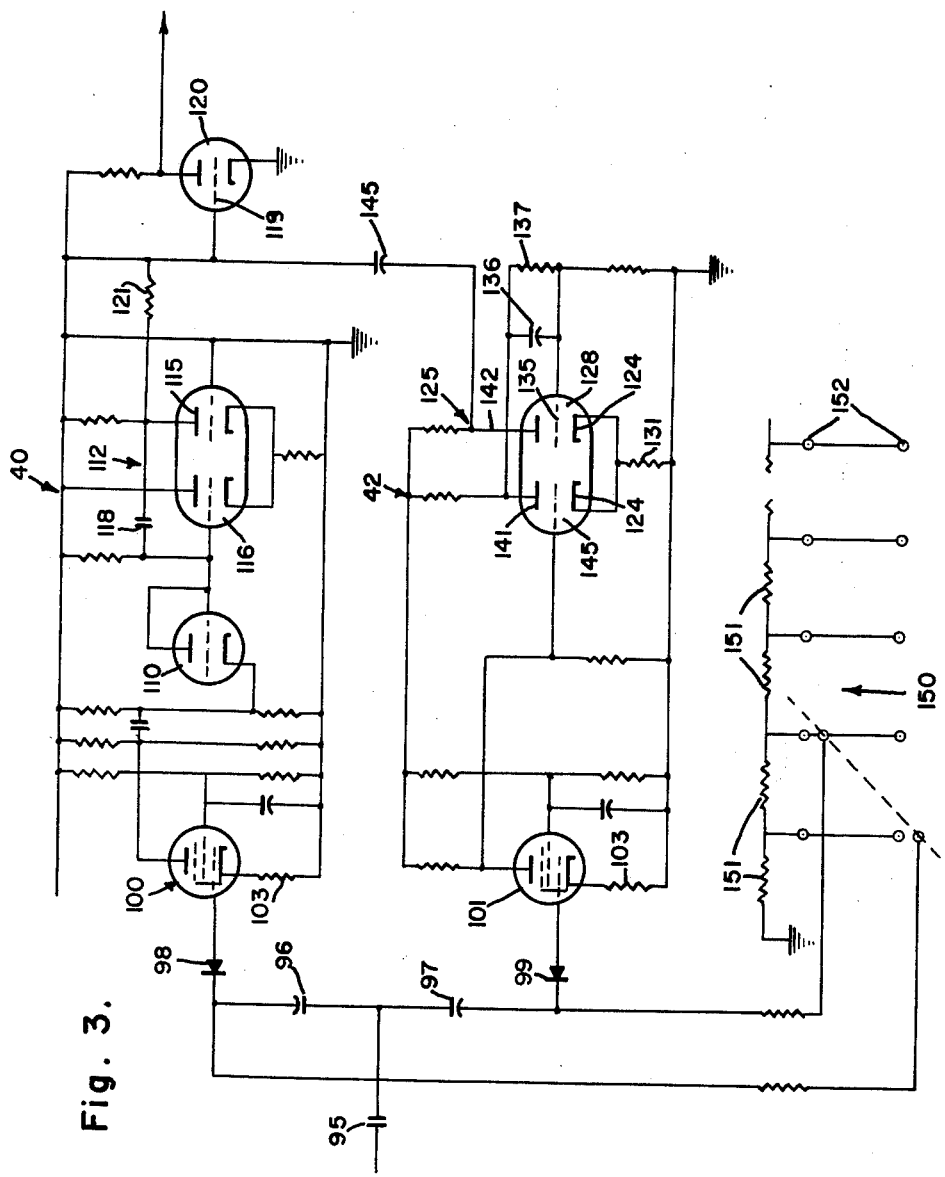
FIG. 3 is a schematic view showing the discriminating circuit of the particle counter.

The output from line 35 is applied to the discriminator circuit which is indicated as upper and lower discriminators 41 and 42 and is shown schematically in FIG. 3. The upper and lower level discriminators receive their input through a capacitor 95 and through capacitors 96 and 97 to the respective upper and lower level discriminators 41 and 42 respectively. The signals are fed through diodes 98 and 99 to a first amplifying stage 100 of upper level discriminator 41 and an amplifier 101 of a lower level discriminator.

The amplifiers 100 and 101 are each provided with cathode biasing resistors 103 and appropriate control voltages to cause the amplifiers to function within the required linear ranges. The output of amplifier 100 is fed directly to an isolation tube 110 in which the output of the tube is fed directly to a single shot multi-vibrator or flip-flop circuit generally indicated at 112.

Multi-vibrator circuit 112 is of the type that will change state for a predetermined time interval subsequent to the multi-vibrator being pulsed and will remain in the change of state for a predetermined time interval thus producing a square wave of a predetermined time interval from each pulse. This function is accomplished by coupling the anode 115 of one triode section of the multi-vibrator to the grid 116 of the other section of the triode through a coupling capacitor 118. The value of the condenser in relationship to the circuit components will determine the time constant or pulse length formed by the multi-vibrator.

The output from multi-vibrator 112 is fed directly to a grid 119 of a mixer tube 120 through a resistor 121. The circuit to grid 119 is so set that normally the grid is held slightly below the operative region of the tube and is brought considerably below the operative region of the tube when multi-vibrator 112 is in the pulsed condition. The lower level discriminator comprises amplifier 101 which operates a Schmidt type trigger generally indicated at 125. The Schmidt trigger is a trigger circuit of the type that will produce a negative spike followed by a positive spike when the trigger is energized and generally comprises a dual triode indicated at 128 having its cathodes 129 connected to a common cathode biasing resistor 130 and with the second grid 135 connected through a capacitor and resistor 136 and 137 respectively to the opposite plate 141. The output from the Schmidt trigger is taken off the other plate 142 and through a condenser 145 to the grid 119 of the mixer tube. When there is no signal appearing from multi-vibrator 112 the positive spike from Schmidt trigger 125 will cause grid 119 to be brought sufficiently less negative to cause tube 120 to conduct for a time interval determined by the pulse width issued by the Schmidt trigger. However, should flip-flop 112 be in its reverse state during the time of the Schmidt trigger pulse there will be a sufficient negative depression of grid 119 so that the positive pulse from the Schmidt trigger will be unable to cause tube 120 to conduct. Thus if the signal appearing from line 35 is sufficient to energize both flip-flop 112 and Schmidt trigger 125 there will be a cancelling effect created which will result in grid 119 staying below the condition necessary to cause tube 120 to conduct. It is only when the lower level discriminator alone issues a pulse that tube 120 will conduct.

The timing of the signal is such that a simultaneous signal reaching grid 135 of Schmidt trigger 125 and grid 116 of multi-vibrator 112 will cause the multi-vibrator to shift and issue its pulse. The same signal will cause the Schmidt trigger to issue a negative pulse and thence a positive pulse. The positive pulse will occur prior to the end of the pulse provided by multi-vibrator 112 so that the positive pulse will be cancelled out by the signal issued by the multi-vibrator.

The upper and lower level discriminators 41 and 42 function as upper and lower level discriminators by virtue of a biasing or control network controlled by stepping switch 150 and comprising a series of resistors 151 connected to the respective terminals of the stepping switch indicated by terminal points 152. The voltages across the respective resistors 151 are arranged to stress the input to amplifiers 100 and 101 with proper voltages so that the lower level discriminator will be responsive to signals above a first predetermined value and upper level discriminator 41 will be responsive to signals above a second predetermined value in which the second predetermined value is at a range above the value that will pass the lower level amplifier. It can thus be seen that the discriminator will thus function to discriminate pulses that are received between the first and second predetermined value ranges. Those below the first predetermined value will not be responsive to register on either of the upper and lower discriminators. Signals which are above the second value will register on both the upper and lower level discriminators and will be cancelled out in the grid circuit of mixer tube 120. The signals which are between the two values will actuate the Schmidt trigger and on the positive spike will cause grid 119 to rise to a level to cause tube 120 to conduct.

Thus the device is effective to sense all pulses which fall within a predetermined height range. As previously indicated the particle size sensed by photo-multiplier 18 will produce a pulse the height of which is an analogue of the particle size. Thus by selectively predetermining the range in which the discriminator will actively sense an effective count of particles a count correlated to a particular or selected particle size is effected. The output from tube 120 is applied to amplifier 45 and to counter 48 so that the number of pulses, indicative of particles within a size group, will be registered by the counter.

The pulse count of counter 48 is arranged to be directly recorded on recorder 39 for permanent recordation thus giving an indication of the number of particles within a particular size group occurring within a predetermined time limit.

Figure 2:
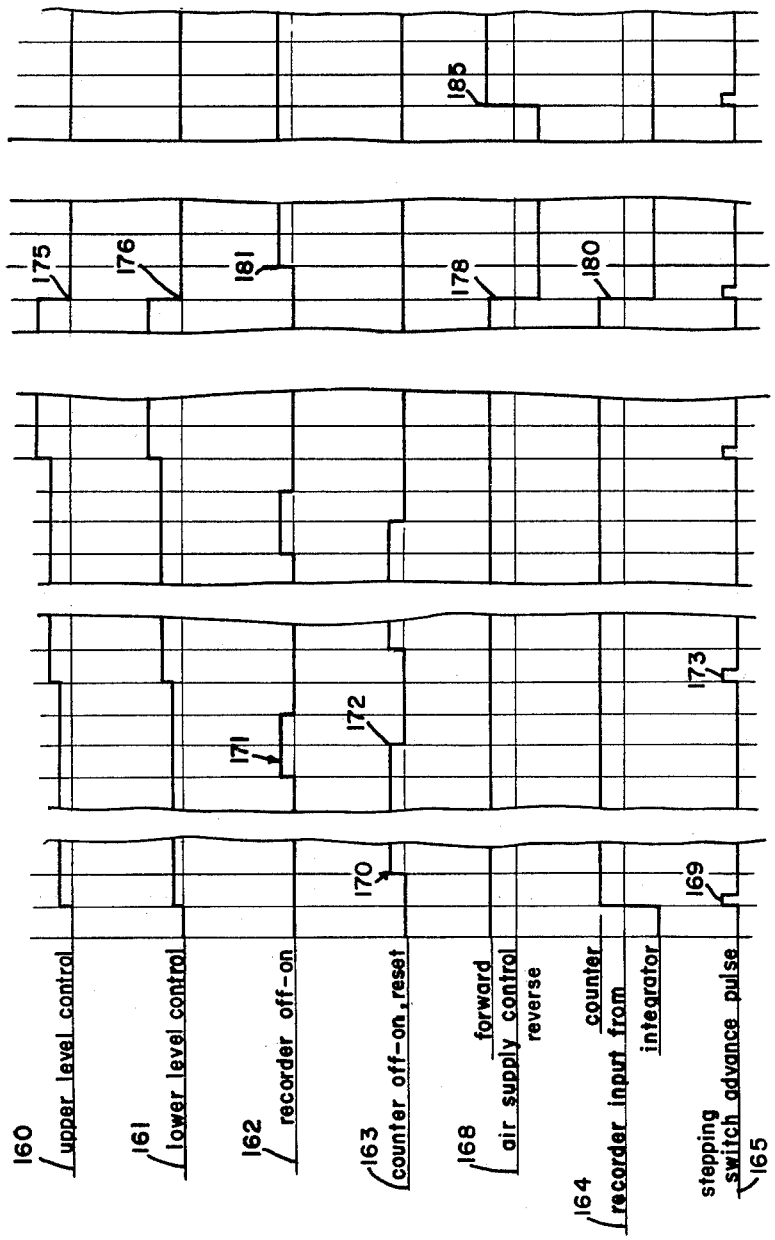
FIG. 2 is a timing chart showing the time logic of the device as shown in FIG. 1.

The timing function provided by stepping switch 50 and timer 60 is set forth in FIG. 2 in which the relative time sequence for the shift of input bias level control for the upper and lower level discriminators 41 and 42 is indicated at 160 and 161 respectively and in which the base line of the graph indicates an off position for the upper and lower level discriminators and each step indicates a change in the relative range for the discriminator. The recorder off and on function is indicated by line 162. A rise of the line above the base line indicates that the recorder is on. The on, off and reset of counter 48 is indicated by line 163. The counter is arranged to reset each time it is turned off and is in the on position when the line appears above the base line.

Recorder input function switch 49 is indicated at line 164 in which a line above the base line indicates a connection between the counter and the recorder and a line below the base line indicates a connection between line 31 from the integrating circuit to the recorder. Line 165 indicates the pulse output that controls the advance of the stepping switch and line 168 indicates the function control of the air supply in the forward and reverse directions indicated by the line appearing above and below the base line respectively. The air supply will be described hereinafter in more detail.

During normal particle count timer 60 is arranged to provide a pulse output to cause stepping switch 50 to advance to its first counting position as indicated at 169 which causes stepping switch 150 to make contact with appropriate resistors 151. Resistors 151 are of selected values to cause the discriminator circuit to count pulses between selected size ranges and can be calibrated so that the value is indicative of particular particle sizes.

During the time that the stepping switch advances recorder 39 and counter 48 are both in the off position. This is done so that any transient pulse which might exist by virtue of the switching of the stepping switch will not register on counter 48. The timer then actuates the counter as indicated at 170 so that the counter will register pulses between a predetermined minimum and maximum range which is indicative of particle sizes of a particular range. The circuit continues in this condition for a predetermined time interval, such as for example one minute, whereinafter recorder 39 is turned on as indicated at 171 so as to register the total pulse count registered by counter 48. Shortly thereafter timer 60 functions to turn counter 48 off and reset the counter as indicated at 172. While both the recorder and the counter are in the off position the next stepping switch advance pulse 173 causes the stepping switch to advance to its next range position by causing the stepping switch to advance to the next contact points 152 whereafter the entire process is repeated again.

It is believed obvious that as many ranges can be sampled for predetermined time intervals as desired. Recorder 39 will register only the total count registered by counter 48 during the time interval that the recorder and the counter are in the on position so that the recorder will show only the totalized pulse count of a predetermined particle size during the selected time period.

At the end of the individual particle count the timer functions to bring the slider of stepping switch 150 to a position as indicated at 175 and 176 which renders the discriminator inoperative and causes the air supply, as will be hereinafter described, to be reversed as indicated at 178 and the input to recorder 39 to be shifted to line 31 of integrator circuit 30 as indicated at 180. After this switching function is complete the recorder is turned on as indicated at 181 and is hereafter left in the on position.

During this interval the recorder will see and record a fluctuating D.C. voltage which reflects the total particle value as seen by photo-multiplier 18. This condition is maintained at a predetermined time interval which generally comprises the period sufficient to insure that stabilization will exist so that an accurate test count can be obtained.

In the next step of operation the controls are maintained exactly as in the preceding step except that the air supply is reversed to the forward direction as indicated at 185 so that a sampling of total pulse count can be had of the ambient rather than the controlled air.

Optical system 15 and air supply 16 are more particularly illustrated in FIG. 5 where the optical circuit comprises a light source 200 which is focused via an optical lens system 201 toward an air gap 203 and is reflected from the air within air gap 203 toward a second optical system 204 wherein the light is received by photomultiplier 18. Air gap 203 is formed in a tube 205 so that air is normaly drawn from atmosphere direct through the tube.

The tube is in fluid communication with a T as indicated at 206 wherein one leg of the T is connected to a filter 207 the opposite end of which is connected to a pump 208. Pump 208 is arranged to draw air down through tube 205, filter 207 and to force the air out a tube 209 to atmosphere through a valve 210. Pump 208 is a constant velocity pump and the air flow within tube 205 is conerolled by a valve 212 between filter 207 and pump 208 and in addition is controlled by providing valving inlet opening 215 into pump 208. It can thus be seen that the amount of air that is allowed into the two valving openings 215 will effectively limit the volume of air that is drawn through tube 205 and air gap 203. In order to reverse the flow of air through pipe 205, valve 210 is reversed so that the air from tube 209 passes to a pipe 220, to a filter 221 and back to T 206. In this condition the air is drawn from atmosphere through valved opening 215 and is forced out of tube 205.

Filter 221 is constructed so as to provide substantially complete filtering of air. Thus when the device is operated in the reverse direction the air passing through air gap 203 will be sufficiently clean so that a test of a clean air condition is insured. This provides a standard or a guide against which other values registered by the device can be calculated. The reverse air flow also provides a somewhat greater velocity air flow through the system and tends to blow out any collection of particles which might become lodged within the tube and which might possibly cause errors that appear within the optical system. It can be seen that in the sequence of operation that when the pump is operating in the reverse direction that recorder 39 will register a clean air condition so that the total pulse count seen will provide a standard which is directly calibrated to a clean air situation. When the forward air flow is switched, as indicated at 185 in the graph of FIG. 2, the total registration on the recorder is indicative of the air contamination which is reversed to the clean air tabulation of the previous step thus giving a base and comparison against which the relative contaminates within the atmosphere can be calculated.

It can thus be seen in the sequence of operation that the device is arranged to progressively measure the number of particles within sequentially tested size ranges that are drawn through tube 205. Recorder 39 is thus active to register the total particle count of particles being drawn through the line of the selected size groups and counted for a predetermined time period.

After the completion of the particular particle size groups the air flow through the air circuit is reversed and the input to the recorder is shifted to a totalized D.C. reverse value which indicates a reverse of total particle count within a clean air situation. Thereafter in the next step of operation the air flow is reversed so that the atmospheric air is measured under the same test conditions. Thus the device gives three basic types of readings indicative of clean or test air measured, total atmospheric particle contamination and particle size of counts for predetermined time intervals. It is believed apparent that the switching and timing circuits 50 and 60 respectively can be of any practical design for this type of function designed to accomplish the timing sequence as indicated in FIG. 2.

Although the foregoing invention has been described in some detail by way of illustration and example for purposes of clarity of understanding, it is understood that certain changes and modifications may be practiced within the spirit of the invention as limited only by the scope of the appended claims.

What is claimed:

1. In an aerosol particle counter of the type having means to establish a path of air, optical means associated with said path of air to cause a change in light value directly correlated to particle size, and photosensing means adapted to sense said change in light values and provide a pulse output for each particle within said path of air which is an analogue of the particle size the improvement comprising: integrator means responsive to the pulse input from said photosensing means to provide a pulse output which pulse output magnitude reflects the size of individual input pulses and a D.C. signal output which D.C. output reflects the additive magnitude value of all pulses received from said photosensing means within a predetermined interval; discriminator means responsive to the pulse output from said integrator means to provide a pulse output for each pulse received which is above a predetermined lower limit and below a predetermined upper limit; counter means responsive to the pulse output from said discriminator means; recorder means; and means to alternatively connect said recorder means to said D.C. signal or to the output of said counter means.

2. In an aerosol particle counter of the type having means to establish a path of air, optical means associated with said path of air to cause a change in light value directly correlated to particle size, and photosensing means adapted to sense said change in light values and provide a pulse output for each particle within said path of air which is an analogue of the particle size the improvement comprising: integrator means responsive to the pulse input from said photosensing means to provide a pulse output and a fluctuating D.C. signal which reflects the additive value of pulses received from said photosensing means within a predetermined interval; discriminator means responsive to the pulse output from said integrator means to provide a pulse output for each pulse received which is above a predetermined lower limit and below a predetermined upper limit; counter means responsive to the pulse output from said discriminator means; recorder means; means to alternatively connect said recorder means to said D.C. signal and to the output of said counter means; bias means connected to said discriminator means to set the upper and lower limits for said discriminator means; switch means to periodically shift said bias means at regular intervals to change said predetermined upper and lower limits; and means operative by said switch means and connected to said counter means to cause said counter means to register the total pulse count on said recorder means during the interval when said switch means is functioning to shift said bias means.

3. In an aerosol particle counter of the type having means to establish a path of air, optical means associated with said path of air to cause a change in light value directly correlated to particle size, and photosensing means adapted to sense said change in light values and provide a pulse output for each particle within said path of air which is an analogue of the particle size the improvement comprising: discriminator means responsive to the pulse output; bias means controlling said discriminator means and operative to cause said discriminator means to provide a pulse output only when said discriminator means is in receipt of a pulse having a voltage value between an upper and lower limit; bias control means to periodically shift the bias to said discriminator means to vary said predetermined upper and lower limits; counter means connected to the output of said discriminator; recorder means; switch means operative to connect said counter means to said recorder means at the termination of the periodic shift of said bias means to cause said counter means to register a total pulse count on said recorder means; and counter reset means comprising said switch means to reset said counter means after recordation of the pulse count of said counter means on said recorder means and prior to the beginning of the periodic shift of said bias means.

4. In an aerosol particle counter of the type having means to establish a path of air, optical means associated with said path of air to cause a change in light value directly correlated to particle size, and photosensing means adapted to sense said change in light values and provide a pulse output for each particle within said path of air which is an analogue of the particle size the improvement comprising: air control means operative in a first condition to cause air from a test atmosphere to compose said path of air and in a second condition to cause air from a controlled source to compose said path of air; integrator means responsive to the pulse output from said photosensing means to provide a first D.C. signal output comprising integrated totalizations of pulses received by said integrator during a predetermined interval and a second output of pulses in the same relative relationship in amplitude and number as received from said photosensing means; discriminator means connected to receive the second signal output from said integrator; biasing means connected to said discriminator to cause said discriminator to be responsive to issue pulses only when pulses are received from said integrator means which are above a low predetermined value and below a high predetermined value; control means connected to the output of said discriminator means; bias control means operative to periodically change the bias to said discriminator means to vary the upper and lower levels; recorder means; counter means connected to receive pulses from said discriminator means; switch means; said switch means operative to alternatively connect said recorder means to said counter and to said first signal output of said integrator and to operatively shift said air control means between its first and second positions of operation and to cause said counter to reset; and timing means operative to program said switch means to cause the first output of said integrator means to be connected to said recorder when said air control means is in the second condition of operation; the first output from said integrator means to be connected to said recorder means during one phase of operation when said air control means is in the first phase of operation and to cause said counter to be connected to said recorder to register a totalized pulse count after said discriminator means has been in each bias condition for its predetermined time interval and to reset said counter means prior to each bias condition being imposed upon said discriminator during another phase of operation.

5. In an aerosol particle counter of the type having means to establish a path of air, optical means associated with said path of air to cause a change in light value directly correlated to particle size, and photosensing means adapted to sense said change in light values and provide a pulse output for each particle within said path of air which is an analogue of the particle size the improvement comprising: pump means establishing said path of air from atmosphere into said pump means; vent means to establish a second air flow into the input of said pump means; means to connect the exhaust of said pump means into the path of air to cause a reversal of the direction of air flow of said path of air; valve means connected to the exhaust of said pump means to alternatively exhaust said pump means to atmosphere and into said path of air; integrator means connected to be responsive to said photosensing means and operative to provide a first pulse output which bears substantially identical relationship in pulse count and relative values of the pulse output from said photosensing means and a second output which integrates the pulses received within a given time limit to provide a D.C. signal output continuously reflecting the total pulse count; means to record said D.C. signal; means to count the number of pulses emanating from said first signal input from said integrator means; means to record the pulse count; and means to periodically shift said valve from the first to the second position.

6. A device according to claim 5 and wherein means are provided to connect said first output line of the integrator means to the recorder means during the time interval when said valve is in position to exhaust the air flow through said path of air and to connect said counter means to said recorder means during a time interval when said valve means is in position to exhaust the air from said pump means to atmosphere.

7. A device according to claim 5 and wherein means are provided to connect said first output line of the integrator means to the recorder means during the time interval when said valve is in position to exhaust the air flow through said path of air and to connect said counter means to said recorder means during a time interval when said valve means is in position to exhaust the air from said pump means to atmosphere; and a filter connected between the exhaust of said pump means and said path of air to provide a clean air flow through said path of air.

8. In an aerosol particle counter of the type having means to establish a path of air, optical means associated with said path of air to cause a change in light value directly correlated to particle size, and photosensing means adapted to sense said change in light values and provide a pulse output which is an analogue of each particle size the improvement comprising: first discriminator means connected to be responsive to the output of said photosensing means; means biasing said first discriminator means to be operative only by pulses which are above a first predetermined value; pulse generating means within said first discriminator means operative to provide a first pulse output having a predetermined time duration each time said first discriminator means is actuated by a pulse input above said first predetermined value; second discriminator means; means biasing said second discriminator means to be responsive to pulses only above a second predetermined value; means connected to said first discriminator means operable to provide a first pulse and a second pulse a predetermined time interval after said first pulse in which said first and second pulses are of opposite polarity each time said second discriminator is pulsed with a pulse above said second predetermined value; said second predetermined value being below said first predetermined value; the input to said first and second discriminators being connected together; the output of said first and second discriminators being connected with said pulse output from said first discriminator being in phase cancelling relationship to the second pulse output from said second discriminator; sensing means connected to the output of said first and second discriminators; means biasing said sensing means to be operative only by the second pulse output from said second discriminator when said second pulse is uncancelled by the pulse output from said first discriminator; means connected to the means biasing said first discriminator and to the means biasing said second discriminator to simultaneously change the bias to shift the upper and lower values of pulses which will be effective in causing said first and second discriminator means to provide output pulses responsive to actuation by said photosensing means; a counter connected to said sensing means and operative to count the pulses sensed by said sensing means; a recorder; and switch means operative to sequentially shift said bias shifting means at the end of predetermined time intervals and to connect said counter means to said recorder means at the termination of said predetermined time intervals and before the reset of said bias means for the next succeeding interval and to further reset said counter during the shift of said bias means from one condition to the next.

9. In an aerosol particle counter of the type having an optical sensing means responsive to provide a pulse output for each particle passing through the particle counter in which each pulse has a pulse height directly proportional to the size of the particle size the combination of: integrator means connected to said optical sensing means; said integrator means having a first section operative to provide a pulse output substantially equivalent to the pulse input and a second section comprising an RC time constant circuit operative to provide an instantaneous D.C. voltage output which is an analogue of the totalized pulse input; discriminator means connected to said first section; means within said discriminator means to sense pulses within a predetermined pulse height range; recorder means; and means to alternatively connect said recorder means to said discriminator means and said second circuit of said integrator means whereby a record is made of the total particle density and the number of particles within a given size range.

10. In an aerosol particle counter of the type having means to establish a path of fluid, optical means associated with said path of fluid to cause a change in light value directly correlated to particle size; photosensing means adapted to sense changes in light value and to provide an electrical pulse output for each particle within said path of air, each pulse having an amplitude which is an analogue of the particle size; integrator means connected to receive the pulses from the photosensing means to provide a D.C. signal having an additive amplitude indicative of all pulses received to indicate a density count of all particles sensed over a predetermined time period; and discriminator means connected to receive pulses having an amplitude directly proportional to the size of individual sensed particles, the discriminator providing a pulse output for each received pulse which falls within a predetermined amplitude range, whereby comparison of the D.C. signal from the integrator and the pulse signal from the discriminator over like time periods determines the ratio of all particle density to particles of a given size.

References Cited in the file of this patent

UNITED STATES PATENTS

| | | |
|---|---|---|
| 1,219,373 | Byers | Mar. 13, 1917 |
| 1,482,376 | Anderson | Feb. 15, 1924 |
| 2,494,441 | Hillier | Jan. 10, 1950 |
| 2,520,932 | Hoeppner | Sept. 5, 1950 |
| 2,661,902 | Wolff et al. | Dec. 8, 1953 |
| 2,673,294 | Battell et al. | Mar. 23, 1954 |
| 2,731,202 | Pike | Jan. 17, 1956 |
| 2,775,159 | Frommer | Dec. 25, 1956 |
| 2,920,525 | Appel et al. | Jan. 12, 1960 |

OTHER REFERENCES

"Measurement of the Size-Distribution of Spray Particles" by Wheeler and Trickett, from Electronic Engineering, October 1953, pages 402–406.

"Electronic Instrumentation of a Device to Automatically Count and Size Particles in a Gas," by Gordon et al., from IRE Transactions on Instrumentation, vol. 1–6, No. 1, March 1957.